Patented May 12, 1942

2,282,705

UNITED STATES PATENT OFFICE 2,282,705

CHEMICAL PROCESS

Albert S. Carter, Wilmington, Del., and Frederick Baxter Downing, Carneys Point, N. J., assignors to E. I. du Pont de Nemours & Company, Wilmington, Del., a corporation of Delaware No Drawing. Application August 4, 1939, Serial No. 288,369

3 Claims. (Cl. 260—678)

This invention relates to a method for the continuous production of monovinylacetylene. More particularly it relates to an improved process for the catalytic production of monovinylacetylene from acetylene. Still more particularly, the invention relates to the continuous catalytic polymerization, under pressure, of acetylene to monovinylacetylene.

This application is a continuation-in-part of applicants' copending application, Serial No. 78,584, filed May 8, 1936, and, through it, of applicants' U. S. Patent No. 2,048,838 issued July 28, 1936.

It is known that acetylene can be polymerized to produce non-benzenoid polymers thereof, and catalysts for such polymerization have been described. For some purposes, it is desirable to so conduct the polymerization of acetylene that the principal product is monovinylacetylene, the yield of higher polymers (particularly divinylacetylene) being minimized.

As described in the parent applications, improved yields of monovinylacetylene which is the first acetylene polymerization product, are obtained if the monovinylacetylene is removed from the reaction zone before substantial amounts of divinylacetylene are formed. A preferred method for carrying out the invention involved passing acetylene over the catalyst solution at such a rate that a part was converted to monovinylacetylene, but little or none was converted to divinylacetylene, then separating monovinylacetylene from the effluent gases and thereafter returning the unreacted acetylene to the process. It was also disclosed that the improvement could be applied to other known methods for the catalytic production of monovinylacetylene, for example, that method in which a body of the catalyst is charged with acetylene, then allowed to age for a short period and thereafter stripped of the acetylene and reaction products. It was also disclosed that this catalyst, after stripping, could be reused. The parent applications have taught that by adjusting the contact time between acetylene and catalyst, the yield of higher polymers may be reduced and with very short contact times the yield of higher polymers is inappreciable.

It is an object of this invention to provide an improved process for catalytically producing monovinylacetylene from acetylene. A further object is to provide a process of this type in which the production of monovinylacetylene per unit time per unit weight of catalyst is improved. A further object is to accomplish this improved unit production without decrease in yield of monovinylacetylene, based on the acetylene consumed. Other objects will appear hereinafter.

These objects have been accomplished by increasing the pressure in the reaction zone. The yield of monovinylacetylene is maintained without decrease by maintaining constant the time of contact with the catalyst; i. e., by increasing the throughput. In general, according to the invention, the conventional catalysts, operating temperature and reactor design being used, the pressure is increased to preferably not over 5 atmospheres. The monovinylacetylene and unreacted acetylene are removed from the reaction zone before substantial amounts of divinylacetylene are formed. To accomplish this, an acetylene conversion of 20 per cent per cycle generally is not exceeded.

The following examples illustrate, but do not limit, the invention, Example I being given for comparison and not as illustrative of the invention herein claimed.

Example I

Using a reactor system of the type described in Example I of U. S. Patent 2,048,838, the catalyst tube was charged approximately half full of a 55 per cent solution of $Cu_2Cl_2.2NH_4Cl$ in water. This catalyst solution was aged at 60° C. under nitrogen with metallic copper powder to complete its reduction and was finally adjusted to a pH of 1 by the addition of hydrochloric acid. After thorough aging, the temperature of the reaction solution was brought to 65° C. and was thoroughly saturated with acetylene, during this period of saturation, the gas flow through the catalyst tube and the auxiliary condenser and fractionation system was adjusted to such a rate that the contact time in the reaction zone was approximately 16 seconds. With the gas pressure on the reaction system at approximately 1 atmosphere (783 mm.), when the system came to equilibrium, the conversion of acetylene to higher polymers was approximately 10 per cent and the proportion of monovinylacetylene to higher polymers was 14 to 1.

Example II

Operating in the same manner as in Example I, and with the same weight of catalyst but under a gas pressure of approximately 2 atmospheres (1456 mm.), the contact time was again adjusted to approximately 16 seconds; it was again found that the conversion was 10 per cent and the proportion of monovinylacetylene to higher polymers was 14 to 1, but in this case, since the contact time was the same and the pressure was doubled, the throughput of acetylene (the mass of acetylene passed through the reaction zone) was approximately doubled (increased by a factor of 1.86) and since the per cent converted was the same, the unit production of monovinylacetylene was in the same ratio to the unit production of Example I as was the throughput of acetylene, i. e., 1.86.

*Example III*

Operating in the manner of Example I but at a pressure of 812 mm. and a gas circulating rate providing a contact time of 23.8 seconds, the conversion of acetylene to higher polymers was 14.5 per cent and the proportion of monovinylacetylene to higher polymers was 11 to 1.

*Example IV*

Example III was repeated with the pressure increased to 964 mm. but with the same rate of gas flow (i. e., the same mass flow but decreased volume flow) thereby increasing the time of contact with the catalyst in the reaction zone to approximately 28 seconds. It was observed that the conversion increased to 17.6 per cent and the proportion of monovinylacetylene to higher polymers decreased to 7.16 to 1.

*Example V*

Example III was repeated with the pressure increased to 1343 mm. but with the same rate of gas flow thereby increasing the time of contact with the catalyst in the reaction zone to approximately 39 seconds. The observed conversion of acetylene to polymers was 20 per cent and the proportion of monovinylacetylene to higher polymers was 6.5 to 1.

From an examination of Examples I and II, it is clear that an increase in pressure results in increased monovinylacetylene production per unit time and per unit weight of catalyst. A comparison of these examples also shows that where the time of contact between the acetylene and the catalyst in the reaction zone is maintained constant, the increase in monovinylacetylene production is accomplished without materially changing the yield of monovinylacetylene based on amount of acetylene converted to polymers. Examples III to V show that increase in pressure and contact time results in increased production, but that there is a decrease in yield of monovinylacetylene. That this decrease in yield is due to increased contact time is shown by a comparison of Examples II and V where the pressures are very similar and the contact times are quite different.

The pressure under which the process is operated is not critical. The conversion of acetylene to reaction products is roughly proportional to acetylene partial pressure. The limiting range of pressure is the safe operating limit with the equipment available. Owing to the ease of explosive decomposition of acetylene under pressure and at elevated temperature, it is considered unwise, although not inoperative, to operate pure acetylene at the reaction temperature under a pressure in excess of 4 to 5 atmospheres. The preferred pressure range is from 1.5 to 5 atmospheres. The upper portion of this range of pressure is sufficiently high that dangerous explosions may result if initiated by vinylacetylene peroxides or acetylides. The especially preferred operating range is from 2 to 2.5 atmospheres. Wherever in this application the pressure is specified in atmospheres, absolute pressure in atmospheres is meant.

The temperature range for the reaction and the catalyst composition may comprise any of the known methods of operation. As stated in Serial No. 78,584, the upper limit of operating temperature is determined by the boiling point of the catalyst solution. Therefore, under pressure the operating temperature can be higher, if desired, than at atmospheric pressure. A convenient range of operating temperatures are 40°–100° C., and particularly 60° to 75° C.

Any catalyst capable of promoting the polymerization of acetylene to non-benzenoid polymers thereof may be used. Thus, catalysts comprising cuprous salts alone or in admixture with an ammonium salt, a salt of a nitrogenous base, or a salt of an alkali or an alkaline earth metal may be used. Chlorides are preferred. A particularly useful composition comprises cuprous and potassium chlorides in aqueous solution. The medium of the catalyst mixture may be water, an aqueous inorganic acid solution, an organic acid or certain non-aqueous solvents such as glycerol as have been described in the literature, see, for example, U. S. Patents 1,926,039, 1,926,055, 1,926,056, 2,048,838, and 2,162,373. The catalysts of any of these patents may be used, as may those disclosed and claimed in U. S. application Serial No. 210,159, filed May 26, 1938, and Serial No. 282,059, filed June 30, 1939. A preferred method of operation applies catalysts which are acidified slightly (approximately pH1) prior to saturation with acetylene, preferably with hydrochloric acid. Preferred catalysts also are reduced, generally with powdered copper, to practically eliminate cupric copper prior to use. None of these features of catalyst composition is an element of the present invention, except in so far as they constitute the known processes for the manufacture of vinylacetylene by polymerization of acetylene which have been herein improved through the contribution of a method of pressure operation.

In U. S. application Serial No. 78,584, filed May 8, 1936, we have disclosed that an increase of pressure on the acetylene cycling system results in an increase in the absorbed acetylene in the catalyst and, therefore, a proportionate increase in production. It has also been disclosed in the parent applications that an increase in monovinylacetylene produced, thereby increasing its concentration in the effluent gases, results in an increased production of divinylacetylene. In the parent applications, we have described a method of adjusting the gas flow-rate by analysis of the effluent to produce any desired concentration of divinylacetylene, reducing it almost to an inappreciable concentration if desired.

This technique is applicable also to the elimination of divinylacetylene in pressure operation. Therefore, by applying the methods described in the parent application, we find that it is possible to operate under pressure thus obtaining the advantage of increased production per unit weight of catalyst, but without loss of yield of vinylacetylene if the gas flow rate is properly adjusted to minimize the production of divinylacetylene.

In an example in Serial No. 78,584, at atmospheric pressure, an effluent gas was obtained from operation with a standard cuprous chloride catalyst consisting (on a volume basis) of 85 per cent acetylene, 11 per cent vinylacetylene and the balance divinylacetylene, butadienylacetylene, other higher polymers, acetaldehyde, etc. The composition of this gas corresponds to a conversion of approximately 20 to 25 per cent of the input acetylene. This example represents performance of high efficiency; average performance over a wide range of catalyst compositions indicates a ratio of vinylacetylene to higher polymers of about 5.5 to 6.0 with a conversion of 15 per cent of the input acetylene. These yields are considered satisfactory, therefore, when operating under pressure, it is desirable to adjust the gas flow rate in such a manner that comparable yields are maintained. It has been found that the increase in production with increase in pressure is approximately proportional; and it has been found that under pressure, just as at atmospheric pressure, the yield of vinylacetylene decreases with increase in conversion of acetylene. Therefore, if the rate of gas flow is increased as the pressure is increased, the conversion can be held approximately constant, and, thereby, the yield is held approximately the same. Thus, in a system in which the conversion is 15 per cent with a yield of 85 per cent at a gas flow of 100 cu. ft. per minute at atmospheric pressure if the pressure is increased to 2 atmospheres, the gas flow must be increased to 200 cu. ft. per minute (measured at atmospheric pressure) to maintain approximately the same conversion and yield. If the system is operated at 100 cu. ft. of gas flow (measured at atmospheric pressure) and a pressure of 2 atmospheres, the conversion will be roughly doubled and the yield will be substantially decreased. The yields are considered satisfactory for the manufacture of vinylacetylene if of the order of 75 to 100 per cent, corresponding to conversions of 20 per cent or less. Preferably, the conversion is from 10 to 15 per cent.

It is apparent that many widely different embodiments of this invention may be made without departing from the spirit and scope thereof and it is not intended to be limited except as indicated in the appended claims.

We claim:
1. A process for the manufacture of monovinylacetylene by the polymerization of acetylene which comprises polymerizing acetylene in the presence of a cuprous salt catalyst capable of promoting the polymerization of acetylene to non-benzenoid polymers thereof, maintaining a pressure in the reaction zone of from 1.5 to 5 atmospheres, and removing the resulting monovinylacetylene together with unreacted acetylene before 20 per cent conversion of acetylene to polymers thereof takes place.

2. A process for the manufacture of monovinylacetylene by the polymerization of acetylene which comprises continuously polymerizing acetylene in the presence of a cuprous salt catalyst, maintaining a pressure in the reaction zone of from 1.5 to 5 atmospheres, maintaining the temperature in the reaction zone between 40° and 100° C. and removing the resulting monovinylacetylene together with unreacted acetylene before 20 per cent conversion of acetylene to polymers thereof takes place.

3. A process for the manufacture of monovinylacetylene by the polymerization of acetylene which comprises continuously polymerizing acetylene in the presence of a catalyst comprising cuprous chloride and a member of the group consisting of ammonium chloride, chlorides of nitrogenous bases and chlorides of alkali and alkaline earth metals, maintaining the pressure in the reaction zone from 2 to 2.5 atmospheres, maintaining the temperature in the reaction zone between 60° and 75° C., and removing the resulting monovinylacetylene together with unreacted acetylene when a conversion of acetylene to polymers thereof of between 10 and 15 per cent takes place.

ALBERT S. CARTER.
FREDERICK BAXTER DOWNING.